United States Patent [19]
Frost et al.

[11] 3,835,207
[45] Sept. 10, 1974

[54] METHOD FOR FORMING REVERSE OSMOSIS MEMBRANES COMPOSED OF POLYAMIC ACID SALTS

[75] Inventors: Lawrence W. Frost; Luciano C. Scala, both of Murrysville, Pa.

[73] Assignee: Westinghouse Electric Corporation, Pittsburgh, Pa.

[22] Filed: May 3, 1972

[21] Appl. No.: 249,997

[52] U.S. Cl............ 264/41, 117/62.1, 117/161 P, 210/500, 260/78 TF
[51] Int. Cl..................... B29d 27/04, C08g 20/40
[58] Field of Search............ 260/78 TF; 264/41, 49; 210/500; 117/161 P, 62.1

[56] References Cited
UNITED STATES PATENTS

| | | | |
|---|---|---|---|
| 3,179,634 | 4/1965 | Edwards | 260/78 TF |
| 3,518,219 | 6/1970 | Lavin et al. | 260/78 TF |
| 3,598,241 | 8/1971 | Vandracek et al. | 210/321 |
| 3,676,193 | 7/1972 | Cooper et al. | 264/41 |
| 3,737,478 | 6/1973 | Boldebuck | 260/78 TF |
| 3,778,411 | 12/1973 | Emerick et al. | 260/78 TF |

*Primary Examiner*—M. J. Welsh
*Assistant Examiner*—Gary R. Marshall
*Attorney, Agent, or Firm*—D. P. Cillo

[57] ABSTRACT

A polymeric membrane is prepared by reacting a suitable derivative of a tri or tetracarboxylic acid with a diamine to form a polyamic acid, forming a film from the polyamic acid, imidizing the polyamic acid film to form a polyamide-imide film, treating the polyamide-imide film to open the imide rings, to form a permselective membrane comprising water insoluble polyamic acid salt polymers.

28 Claims, 1 Drawing

PATENTED SEP 10 1974　　　　　　　　　　　3,835,207
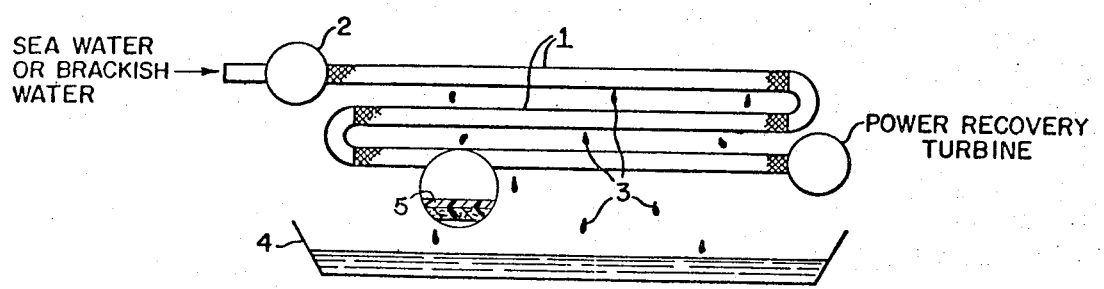

METHOD FOR FORMING REVERSE OSMOSIS MEMBRANES COMPOSED OF POLYAMIC ACID SALTS

BACKGROUND OF THE INVENTION

This invention relates to polyamic acid salt polymer membranes made by opening the imide ring of cured polyimide films with an aqueous solution of a base containing an ion such as Na, K, Ba or trimethylbenzylammonium. Polyimide films are formed, in one case, by heat curing the product of an aromatic dianhydride and an aromatic diamine reacted in a polar aprotic solvent, as shown below in simplified form:

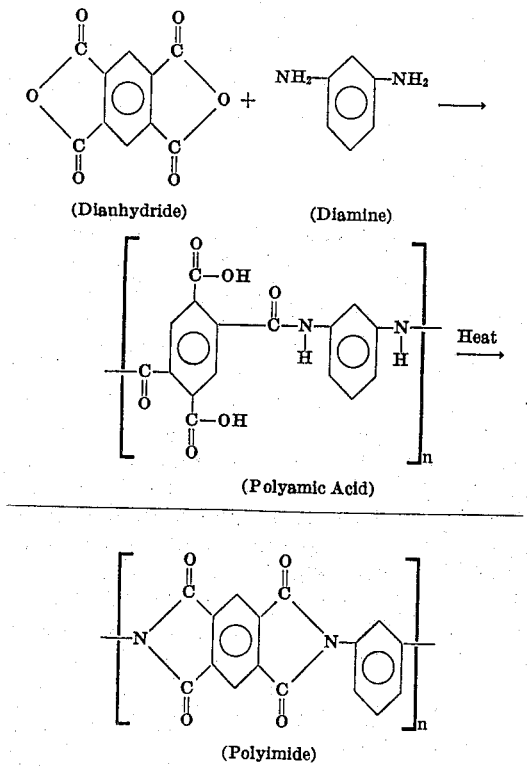

These cured aromatic polyimide polymers have been used as molding powders, high temperature wire enamels and high temperature films, useful for electrical insulating purposes. The preparation of such polymers is described in U.S. Pat. Nos.: 3,179,614; 3,179,634 and 3,179,635, among others.

Richter in U.S. Pat. No. 3,567,632 teaches permselective nitrogen linked aromatic polymeric asymmetric membranes. Richter teaches inclusion of pendant ionic groups, such as sulfonate, carboxylate, phosphate, ammonium and phosphonium groups on the aromatic constituents of his polymer to increase the water flux of his membrane. Richter sets an upper limit of 1 pendant ionic group per 500 units of polymer molecular weight. Richter generally forms his membranes by ice water leaching of a protomembrane, formed by solution extruding or evaporating a cast solution. The Richter solution contains the aromatic polymer and a salt such as LiCl, LiNO$_3$, CaBr$_2 \cdot$2H$_2$O or CaCl$_2$ dissolved in organic polar solvent, at least 75 percent of the salt and solvent being leached from the membrane and the remainder being removed by a rinse medium. Examples of some of the simplest Richter permselective polymers include:

And

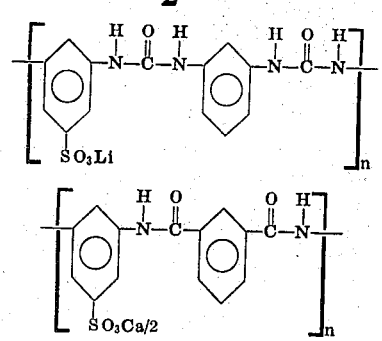

SUMMARY OF THE INVENTION

Applicants have provided nitrogen-linked polymeric membranes by reacting a compound selected from the group consisting of dianhydrides, monoester diacyl halides, anhydride monoacyl halides, diester diacyl halides and mixtures thereof with the reaction product of an aromatic dicarboxylic acid halide and a diamine in a polar aprotic solvent to form a polyamic acid solution, casting the polyamic acid solution, curing the polyamic acid at between about 100°–350°C to form a polyimide film, and treating the polyimide film with an aqueous alkali solution to form a permselective membrane comprising water insoluble polyamic acid salt polymers.

Applicant's method utilizes compounds such as sodium, potassium, tetrasubstituted ammonium or barium hydroxide to open the imide ring in the polymers of the cast polyimide films and introduce hydrophilic Na, K, Ba or tetrasubstituted ammonium carboxylate constituents into the polymer. This provides a high temperature resistant, non-biodegradable, hydrolysis-resistant permselective membrane having a uniform cross-section.

Amic acid salt membranes can also be prepared by reacting the amic acid form of the polymer with alkaline solutions. However, the method of this invention, which must include the intermediate formation of a cyclic imide group has several advantages. Our method provides reverse osmosis membranes having more consistent and much improved salt rejection. Another advantage is that the polyimide film is a strong solvent free material that can be stored indefinitely without deterioration, and then converted to the active salt form by a brief exposure to the proper solution or solutions. The amic acid film on the other hand, is much more fragile, is difficult to obtain free from solvent and is subject to hydrolytic degradation on storage. The polyimide film can also be easily used in a continuous process to form membrane strips by passing it in film form from a roll through a bath of an aqueous solution of a strong base.

BRIEF DESCRIPTION OF THE DRAWING

For a better understanding of the invention reference may be made to the preferred embodiment, exemplary of the invention, shown in the accompanying drawing, which is a diagram showing the principle for extracting fresh water from sea or contaminated water by reverse osmosis.

DESCRIPTION OF THE PREFERRED EMBODIMENTS

The basic concept of the present invention is to provide a new and improved method of making polyamic acid salt polymer reverse osmosis membranes. This polymer membrane contains a high concentration of hydrophilic carboxylate salt constituents. The high concentration of hydrophilic groups in the polymer membrane provides excellent reverse osmosis performance when the membrane is properly prepared.

Osmosis occurs when two solutions of different concentrations in the same solvent are separated from one another by a membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis," "pressure osmosis" and "hyperfiltration" are used to describe this process.

The drawing illustrates a typical tubular-type reverse osmosis system. Sea water or contaminated water is pumped through a battery of support tubes 1. The pump 2 can operate at about 1,500 psi. The tubes can be mounted in batteries of about 150 each. They serve to support the reverse osmosis membrane 5 contained within the tube wall.

The tube may be made of a variety of materials such as porous fiberglass or perforated stainless steel. The preferred porous tubular support is made from epoxy phenolic, melamine-formaldehyde or polyester resin bonded filler particles, such as sand, having an average particle size range between 40–500 microns, as described in U.S. Pat. No. 3,598,241. Of course, flat plate type reverse osmosis modules which are well known in the art can be used to support the membranes made by the method of this invention. The tube walls that support the reverse osmosis membranes must be able to withstand the pressure exerted on them by the pump, and must be able to allow egress of the pure water 3 into a collecting pan 4. For sea water several passes through a system of this type may be required before the water is usable.

Reverse osmosis membranes are formed in the method of this invention, by (1) reacting a tri or tetra-carboxylic acid derivative with a diamine in a polar aprotic solvent, at between about −50° to 150°C, to form a polyamic acid solution, (2) casting the polyamic acid solution on a support such as, for example a glass plate, the inside of a glass, metal or porous resin bonded sand tubular support, (3) curing the polyamic acid at between about 100°–350°C, for about 1–100 hours, to imidize the polyamic acid and form a polyimide film between about 0.01–10 mils thick on the support, and (4) reacting the polyimide film with a 0.5–20 percent aqueous alkali solution, at between about −10° – 40°C, to open a substantial portion of the imide rings of the polymers in the polyimide film, and introduce hydrophilic Na, K, tetrasubstituted ammonium or Ba carboxylate constituents into the polymer to form a permselective porous membrane comprising polyamic acid salt polymers.

In a preferred embodiment of the method of this invention, aromatic dicarboxylic acid halides are reacted with an aromatic diamine at between about −50°C to 150°C in a polar aprotic solvent, to form an amine-terminated aromatic polyamide, which is filtered, washed, diluted with polar aprotic solvent and then reacted with an aromatic dianhydride. This extra step provides a membrane with improved flexibility and an optimum of hydrophilic groups.

Any dianhydride containing two cyclic anhydride groups is suitable in the present invention. Both five and six membered anhydride rings are useful. Dianhydrides known or contemplated to be particularly suitable are: 1,2,4,5-benzenetetracarboxylic dianhydride (PMDA), 3,4,3',4'-benzophenonetetracarboxylic dianhydride (BTDA), 2,3,6,7-naphthalene tetracarboxylic dianhydride, 1,2,5,6,-naphthalene tetracarboxylic dianhydride, 1,8,4,5, naphthalene tetracarboxylic dianhydride, 3,4,3',4'-biphenyl tetracarboxylic dianhydride, 2,3,2',3'-biphenyl tetracarboxylic dianhydride, bis-(3,4,-dicarboxyphenyl) methane dianhydride, 2,2,-bis-(3,4-dicarboxyphenyl) propane dianhydride, 1,2,3,4-cyclopentane tetracarboxylic dianhydride, tetrahydrofurane 2,3,4,5-tetracarboxylic dianhydride, 1,2,5,6-hexane tetracarboxylic dianhydride, bis-(3,4-dicarboxyphenyl) sulfone dianhydride, bis-(3,4-dicarboxyphenyl) ether dianhydride, bicyclo (2,2,2,)-octen-(7) 2,3,5,6 tetracarboxylic dianhydride and mulophanic dianhydride.

Diester diacyl halides can be substituted in whole or in part for the dianhydrides. In these compounds each anhydride grouping is replaced by an ester group and an acyl halide group, situated for example, in aromatic compounds ortho or peri to each other. Thus for example compounds such as 2,5-bis (carbomethoxy) terephthaloyl chloride or 4,6-bis (carboethoxy) isophthaloyl bromide can be substituted for pyromellitic dianhydride.

Another class of compounds useful as substitutes for all or part of the dianhydride reactant consists of compounds containing either (a) one cyclic anhydride plus one acyl halide group or (b) one ester group plus two acyl halide groups, the ester group being ortho to one of the acyl halide groups. Examples of compounds in this class are trimellitic anhydride-4-acidchloride, 2carbomethoxy-terephtaloylchloride and 4-carbomethoxy isophthaloylchloride.

Suitable dicarboxylic acid halides would include isophthaloyl chloride, terephthaloyl chloride, adipoylchloride and the like.

Suitable diamines would include m-phenylene diamine (MPDA), p,p'-diaminodiphenylmethane, p,p' diamino diphenyl ether, p,p'-diamino diphenyl sulfide, p-phenylene diamine and the like.

The polyamic acid can be prepared in a variety of ways. One or more dianhydrides can be reacted with a substantially equimolar quantity of one or more diamines. One or more diamines can be reacted with one or more diacyl halides. The molar ratio of diamine to diacyl halide can be varied from a slightly more than one to a very large excess. With a large amount of diamine, the product will tend to be largely of low molecular weight containing two to three amide linkages per molecule. This amine-terminated polyamide can then be reacted with the dianhydride. Also, the polyamic acid formed from a dianhydride and an excess of diamine, can be reacted with an diacyl halide to give a high polymer amic acid.

Polar aprotic solvents that are useful in applicants' method are the normally liquid organic solvents of the N,N-dialkylcarboxyl-amide class. The preferred solvents are the lower molecular weight members of this class, particularly N,N-dimethylformamide (DMF) and N,N-dimethylacetamide (DMAC). Other typical compounds of this useful class of solvents are: N,N-diethylformamide, N,N-diethylacetamide, N,N-dimethylmethoxy acetamide and N-methyl caprolactam. Other solvents which may be used are: dimethylsulfoxide (DMSO), N-methyl-2-pyrrolidone (NMP), tetramethyl urea, pyridine, dimethylsulfone, hexamethylphosphoramide, tetramethylene sulfone, foramide, N-methylformamide and butyrolacetone. These solvents can be used alone, in combinations of solvents, or in combination with poor solvents such as benzene, benzonitrile, dioxane, xylene, toluene, cyclohexane, acetone and ethanol.

The alkali treatment of the polyimide film is carried out by treating the film with a suitable aqueous alkaline solution such as 0.5–20% NaOH, KOH, Ba(OH)$_2$ or tri-methylbenzylammonium hydroxide (C$_6$H$_5$CH$_2$N(CH$_3$) OH), to form a permselective membrane comprising carboxylate salt polymers. These polymers may be further reacted by an ion exchange reaction with metal salt solutions. The polymer may be represented by the following structural formula:

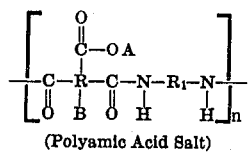
(Polyamic Acid Salt)

where $n$ is an integer between about 10–1500; A is selected from the group consisting of alkali metal ions, preferably Na and K, tetra substituted ammonium ions, or alkaline earth ions, preferably Ba, Ca or Mg, with valency requirements of Ba, Ca and Mg being satisfied by the presence of one divalent ion for each two carboxylate groups in the polymer; B is selected from the group consisting of H and COOA radicals; R is at least one tetravalent aliphatic or aromatic organic radical containing not less than two carbon atoms in which the four valence bonds are arranged in two groups, the members of each aliphatic group being 1,2- or 1,3- to each other; the members of each aromatic group being ortho or peri to each other. Preferably R is at least one tetravalent carbocyclic organic radical selected from the group consisting of:

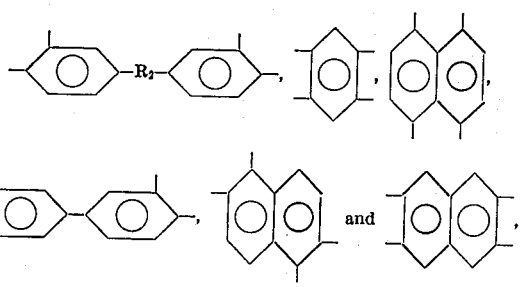

R$_2$ being selected from the group consisting of divalent aliphatic hydrocarbon radicals having from one to four carbon atoms and carbonyl, oxy, thio and sulfonyl radicals and in which R$_1$ is at least one divalent organic radical containing at least two carbon atoms, in which the valence bonds are attached to different carbon atoms. Preferably R$_1$ is at least one divalent carbocyclic organic radical selected from the group consisting of:

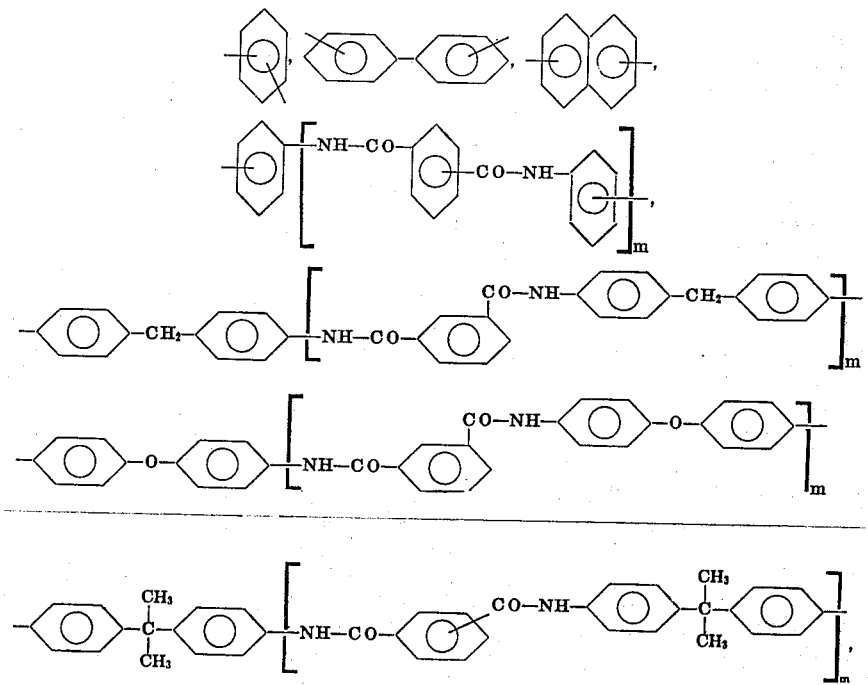

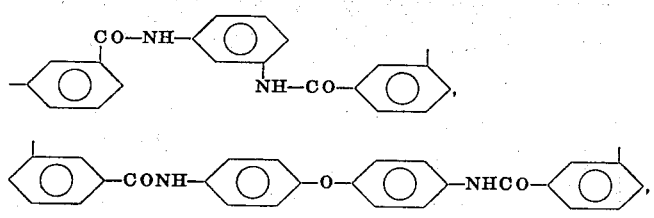

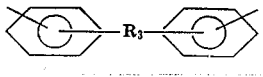

in which $R_3$ is a divalent organic radical selected from the group consisting of $R_2$, silico and amido radicals and $m$ is an integer of from 1 to about 500.

In the preferred embodiment of the method of this invention, wherein aromatic dicarboxylic acid halides are first reacted with an aromatic diamine, the membrane will comprise aromatic polymers which may be represented by the following structural formula:

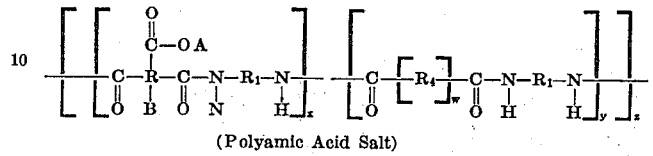

(Polyamic Acid Salt)

wherein $R$, $R_1$, $R_2$, $R_3$, $A$ and $B$ are the same as described above; $R_4$ is a divalent organic radical containing at least one carbon atom; $w$ is 0 or 1; $x$ is an integer between 1-50; $y$ is an integer between 0-50; and $z$ is an integer between 1-1,000.

Once the polyamic acid salt membranes are formed as described, with hydrophilic constituents, the polymer of the membrane may be further reacted with a solution containing at least 0.5 weight percent of a salt containing a cation other than A described above, to form polyamic acid salt membranes containing the new cation in place of all or a portion of the original ion. This reaction involves an ion exchange which may substitute, for example, Mg, Ca, Fe, Ag, Co, Pb, Cu, Li, Mn, Ni, Zn, Hg and Al for all or part of the Na, K, trimethylbenzylammonium or Ba. Suitable salt solutions for this ion exchange reaction can include, for example, $MgSO_4$, $CaCl_2$, $CuSO_4$, $Co(NO_3)_2$, $AgNO_3$, $Pb(NO_3)_2$, LiCl, $MnSO_4$, $Ni(NO_3)_2$, $ZnCl_2$, $Hg(NO_3)_2$, $FeCl_2$, $FeCl_3$, $NH_4Cl$ $(CH_3)_4NCl$, $(CH_3)_3 (C_6H_5CH_2-)$ NCl, and $ClN(CH_3)_3 - (CH_2)_6 - N (CH_3)$ Cl, among others. In addition, chelation may occur with bonding between the metal ion and the nitrogen or oxygen atom of the amide group.

Aqueous solutions are generally preferred for the salt forming and ion exchange reactions. However, all or a portion of the water in these solutions can be replaced by a polar organic solvent such as a lower alcohol or one or more of the polar aprotic solvents listed above.

The preferred polymerization reaction, to form the non water-soluble, aromatic polyamic acid salt polymer permselective membranes, is shown below:

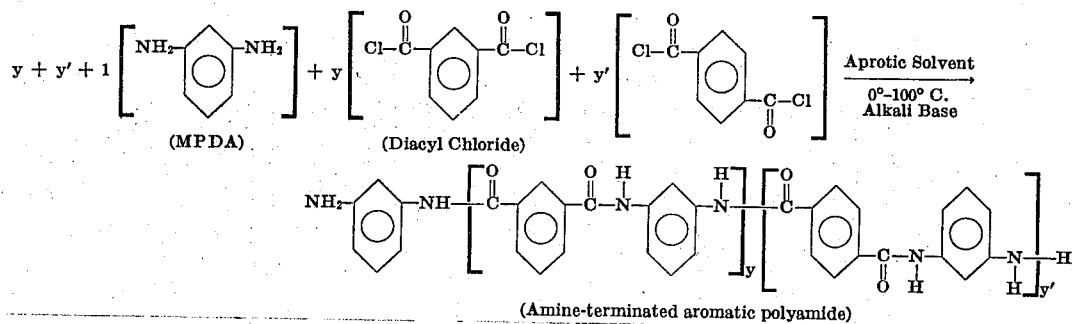

cation in place of all or a portion of the original ion. This reaction involves an ion exchange which may sub- This reaction product is then reacted with an aromatic dianhydride:

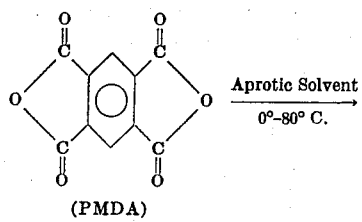

(PMDA)

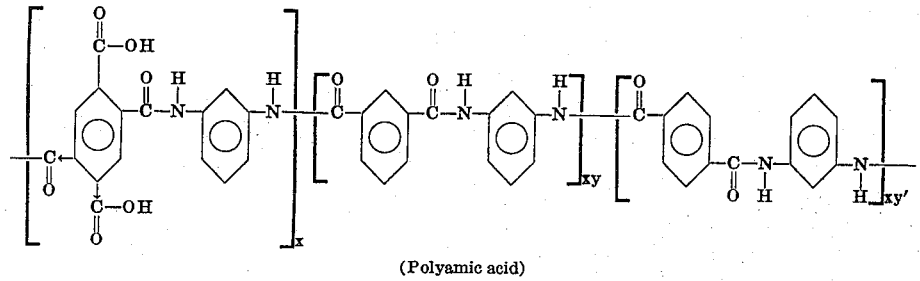

(Polyamic acid)

The arrows indicate isomerism between the two positions indicated. This reaction product is then imidized by heating between about 100°–350°C, to form a solid non-water soluble imidized polymeric film:

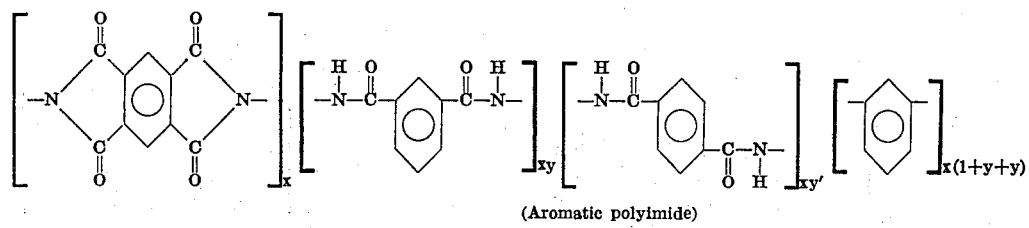

(Aromatic polyimide)

The

group alternates between the other groups. This imidized polymeric film is then treated with aqueous NaOH for about 5–20 minutes, to open substantially all of the imide rings and form the final membrane polymer:

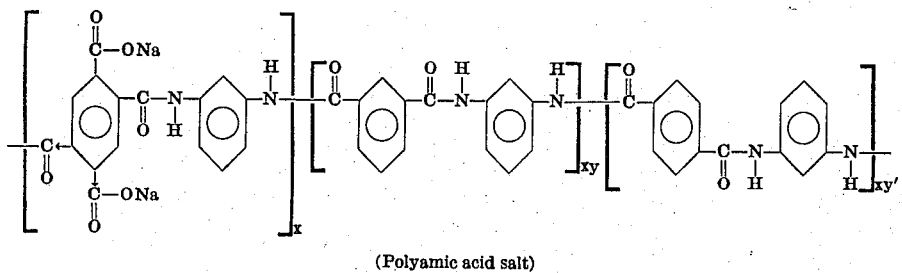

(Polyamic acid salt)

The soluble aromatic polyamic acid is generally cast as a film on a glass plate by spreading the polyamic acid solution in a thin layer by means of an appropriate doctor knife and the solvent removed by heating or evaporation. The resulting, cured, aromatic polyimide film can then be stripped from the glass plate, after which it can be soaked in NaOH or KOH solution, rinsed with water and then dried at moderate temperatures between about 35°–70°C.

Other methods of forming the polyimide films are advantageous for some applications. For example, the polymer solution can be applied to a porous support, and additional baking and alkali treatment steps can be carried out without removal of the membrane from the substrate. Suitable substrates are fritted glass porous fluorocarbons and particulate material bonded with about 1 to 18 weight percent resin, based on resin-filler weight, to form, for example, a bonded tubular sand module. In the latter case, the membrane can be cast in place inside the passage ways of the resin bonded sand module. Another useful form is to extrude the polymer solution through an annular spinneret to form hollow fiber films which can be treated with alkali to form the salt.

Preferably the aromatic polyimide film and the final polyamic acid salt membrane will have a thickness between about 0.01–10 mils. Over 10 mils thickness may result in poor performance because a large number of imide rings may remain intact due to poor penetration of the aqueous alkali solution, unless the film is soaked for a long period of time. Over 10 mils in thickness may also cause reduced flux through the thicker membrane.

Obviously, the polymers useful as permselective membranes in aqueous systems must be sufficiently insoluble in water that they maintain adequate strength and integrity in the presence of a large quantity of flowing water. When the membranes are to be used in an aqueous environment, the compositions must be chosen to meet this requirement. A particularly useful composition for this application is the sodium salt of the polyamic acid derived from about 4 moles pyromellitic dianhydride (PMDA) about 9 moles of isophthaloyl chloride, about 3 moles terephthaloyl chloride and about 16 moles of $m$-phenylenediamine (MPDA). The membrane will have a relatively uniform cross-section of polymer chains having outstanding thermal stability and superior chemical resistance and anti-compacting properties as compared to standard cellulose acetate reverse osmosis membranes, They may be specifically applicable to treatment of certain hot waters or industrial waste waters where the present cellulose acetate membranes cannot be applied. Because they are substantially uniform throughout they are not as easily damaged, as cellulose acetate membranes containing their osmotic skins and either side can be used against the high pressure in the reverse osmosis system.

EXAMPLE 1

An amine-terminated aromatic polyamide was first formed. A mixture of 43.25g. (0.4 mole) of $m$-phenylene-diamine (MPDA), 127 g. (1.2 mole) of sodium carbonate and 307 g. of N,N-dimethylacetamide solvent (DMAC) was stirred while adding a solution of 45.7 g. (0.225 mole) of isophthaloyl chloride, 15.2 g. (0.075 mole) of terephthaloyl chloride, and 103 g. of xylene solvent.

An ice bath was used to keep the reaction temperature below 35°C. The mixture was stirred for 6 hours at 25°C and then allowed to settle for 18 hours. The bulk of the supernatant liquid was decanted through a filter, after which the solid residue was transferred to the filter, sucked dry with a vacuum pump, washed with a mixture of 30 g. of DMAC and 10 g. of xylene, and sucked dry again.

The filtrate and washings were combined and distilled in a vacuum distillation column in a slow stream of dry air at a temperature of 40°–50°C and 3–4 torr vacuum until 469 g. of volatiles had been removed. This treatment removed excess xylene, as well as water produced in the reaction. The residual clear brown solution weighed 251 g. and contained about 82 g. of an amine-terminated aromatic polyamide having an average of about six amide linkages, seven phenylene groups and two amino groups per molecule.

This amine-terminated aromatic polyamide solution was diluted to 351 g. with DMAC and was stirred while pyromellitic dianhydride, (PMDA) was added in small portions, allowing time for each portion to dissolve and the viscosity to stabilize before adding the next portion. More DMAC solvent was added from time to time during the PMDA, addition to reduce the viscosity of the solution to a workable level. The total amount of PMDA added was 20.95 g. (0.0962 mole), and the additional DMAC added was 349g. A clear light brown polyamic acid solution was obtained, having a viscosity of about 30 stokes at 25°C.

A 9 inches × 6 inches × 6 mil (0.006 inch) thick wet film of the polyamic acid solution was cast on a glass plate, using a "Bird" doctor knife applicator. The coated glass plate was baked for 30 minutes at 100°C and then for 3.5 hours at 150°C to cure the film and form a solid aromatic polyamideimide film. The cured film was then stripped from the glass plate. It was clear yellow tough and flexible and had a thickness of 1 mil (0.001 inch). Additional film samples were prepared similarly.

Samples of the solid, non-water soluble aromatic polyamide-imide film were then soaked in a 10 weight percent aqueous solution of NaOH for 10 minutes, rinsed several times in distilled water to remove residual NaOH solution blotted to remove surface water, and then dried for 1 hour between blotters at 65°C. The product was strong, flexible membrane of the sodium salt of the amic acid form of the polymer. In the preparation of this membrane it is desirable that the polyamide-imide film not be thicker than about 10 mils, otherwise the alkali hydroxide may not open enough of the imide rings to introduce sufficient hydrophilic constituents into the polymer to provide a suitable permselective membrane.

A membrane comprising the potassium salt of the amic acid form of the polymer was prepared in the same way as above, substituting 10 weight percent aqueous KOH for the sodium hydroxide. It also provided a strong flexible membrane. Similarly a membrane comprising the trimethylbenzyl ammonium salt of the polyamic acid was prepared from the aromatic polyimide, film by reacting 5 weight percent aqueous trimethylbenzylammonium hydroxide for about 1 hour with the film. The trimethylbenzylammonium salt membrane was not as flexible as the sodium salt or potassium salt membranes. A flexible barium salt membrane was also prepared by soaking the cured amide-imide film in a saturated barium hydroxide solution at 60°C for 46 hours.

Membranes containing the salts of other metals are easily prepared by ion exchange of the sodium, potassium barium or trimethylbenzylammonium salts. A sodium salt membrane sample, as prepared above, was soaked for 15 minutes in a 20 weight percent solution of $CaCl_2$, and then washed and dried as above to give a flexible membrane of the calcium salt of the amic acid form of the polymer. Similar treatment with appropriate salt solutions gave polymer salt membranes of silver, magnesium, cobalt, nickel, copper, aluminum, iron and lead.

EXAMPLE 2

A solution of 25 g. (0.48 mole) of $m$-phenylene diamine, 68 g. (0.64 mole) of sodium carbonate, and 1,800 ml of water was stirred rapidly in a Waring blender while adding a solution of 24.4 g. (0.12 mole) of isophthaloyl chloride 8.1 g. (0.04 mole) of terephthaloyl chloride, and 400 ml of benzene.

The mixture was stirred vigorously for 1 minute and then filtered. The solid product was washed thoroughly with water and dried at 135°C in vacuum to give 42 g. of gray powder. The powder was dissolved in 200 ml of dimethylacetamide, and pyromellitic dianhydride was added in portions until maximum viscosity was reached. The final small increments were added as a solution in dimethylacetamide. The total quantity of pyromellitic dianhydrides used was 10.62 g. and the final product was a clear aromatic polyamic acid solution weighing 250 g. 21 percent solids and having a viscosity of z (Gardner).

This polyamic acid solution was cast, baked to form a solid film having imide linkages, and soaked in NaOH to open the imide linkages, as described in Example 1, to provide a flexible membrane of the sodium salt of the amic acid from the polymer.

We claim as our invention:

1. A method of making a permselective polymeric membrane comprising water insoluble polyamic acid salt polymers by contacting a solid water insoluble polyimide film containing imide rings and having a thickness between about 0.01–10 mils with an alkali solution to open a substantial portion of the imide rings in the film to form a water-insoluble permselective polyamic acid salt polymeric membrane having a thickness between about 0.01–10 mils containing a high concentration of hydrophilic carboxylate salt groups, said membrane being effective to reject salts in applied solutions.

2. The method of claim 1 wherein the solution which is used to open the imide rings is an aqueous solution of a base containing an ion selected from the group consisting of Na, K, Ba and trimethylbenzylammonium and the polyimide film is derived from about 4 moles pyromellitic dianhydride, about 9 moles of isophthaloyl chloride, about 3 moles terephthaloyl chloride and about 16 moles of m-phenylenediamine.

3. The method of claim 1 wherein the polyamic acid salt has the following structural formula:

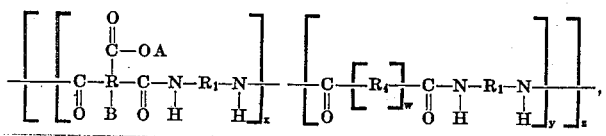

where $w$ is 0 or 1; $x$ is an integer between 1–50; $y$ is an integer between 0–50, $z$ is an integer between 1–1,000; A is selected from the group consisting of Na, K, Ba, and trimethylbenzylammonium; B is selected from the group consisting of H and COOA radicals, R is at least one tetravalent organic radical selected from the group consisting of aliphatic and aromatic radicals containing not less than two carbon atoms in which the four valence bonds are arranged in two groups, the members of each aliphatic group being 1,2- or 1,3- to each other; the members of each aromatic group being ortho or peri to each other, $R_1$ is at least one divalent organic radical containing at least two carbon atoms, in which the valence bonds are attached to different carbon atoms and $R_4$ is a divalent organic radical containing at least one carbon atom.

4. The method of claim 3, wherein R is at least one tetravalent carbocyclic organic radical selected from the group consisting of:

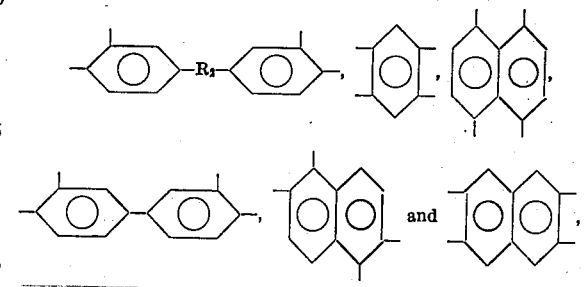

$R_2$ being selected from the group consisting of divalent aliphatic hydrocarbon radicals having from one to four carbon atoms and carbonyl, oxy, thio and sulfonyl radicals and in which $R_1$ is at least one divalent carbocyclic organic radical selected from the group consisting of:

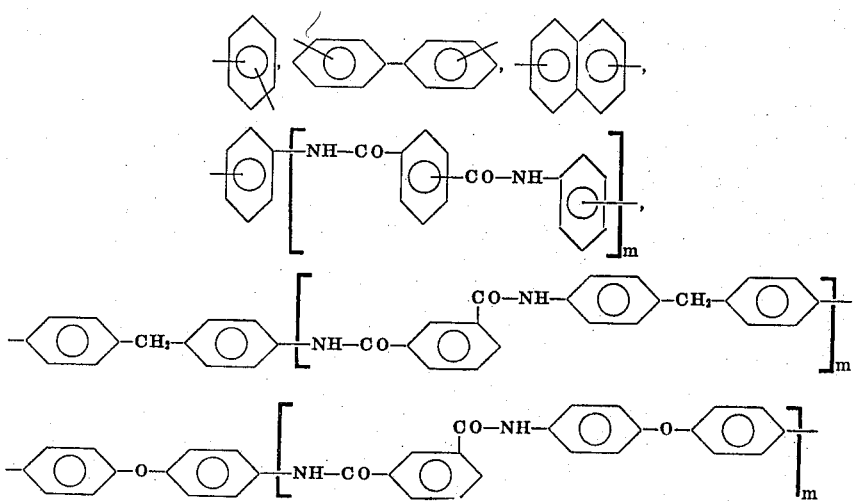

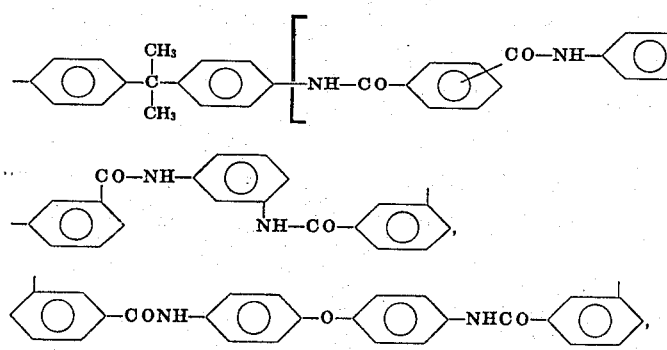

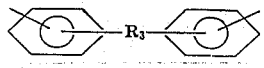

in which $R_3$ is a divalent organic radical selected from the group consisting of $R_2$, silico and amido radicals and m is an integer of from 1 to about 500, $R_4$ is the same as $R_1$ and w is 1.

5. The method of claim 2 wherein, as a last step the polyamic acid salt membrane is reacted with an aqueous metal salt solution containing an ion selected from the group consisting of Mg, Ca, Fe, Ag, Co, Pb, Cu, Li, Mn, Ni, Zn, Hg, and Al.

6. The method of claim 2 wherein, as a last step the polyamic acid salt membrane is reacted with a solution selected from the group consisting of $MgSO_4$, $CaCl_2$, $FeCl_2$, $FeCl_3$, $CuSO_4$, $Co(NO_3)_2$, $AgNO_3$, $Pb(NO_3)_2$, LiCl, $MnSO_4$, $Ni(NO_3)_2$, $ZnCl_2$, $Hg(NO_3)_2$, $NH_4Cl$, $(CH_3)_4$ NCl, $(CH_3)_3(C_6H_5CH_2-)NCl$ and ClN $(CH_3)_3-(CH_2)_6-N(CH_3)Cl$.

7. The method of claim 1 wherein the film is a hollow fiber film.

8. A method of making a permselective polymeric membrane consisting essentially of water insoluble polyamic acid salt polymers comprising the steps of:

A. reacting at least one aromatic dicarboxylic acid halide with an aromatic diamine to form an amine-terminated aromatic polyamide, B. reacting the amine-terminated aromatic polyamide with an aromatic dianhydride in a solvent comprising organic aprotic solvent to form a polyamic acid, C. casting a film from the polyamic acid, D. heating the polyamic acid film to evaporate solvent and form a solid water insoluble polyimide film containing imide rings and having a thickness between about 0.01–10 mils, and E. contacting the polyimide film with an aqueous solution of a base containing an ion selected from the group consisting of Na, K, Ba and trimethylbenzylammonium to open a substantial portion of the imide rings in the film to form a water insoluble permselective polyamic acid salt polymeric membrane having a thickness between about 0.01–10 mils containing a high concentration of hydrophilic carboxylate salt groups.

9. The method of claim 8 wherein the alkali solution used to contact the polyimide film is selected from the group consisting of aqueous NaOH, KOH, $Ba(OH)_2$ and trimethylbenzylammonium hydroxide, the polyamic acid, is cast as a film in step (C) on a porous support, and where after step (D) the imidized film is stripped from the support.

10. The method of claim 8 wherein the film is cast on the inside of a tubular support comprising resin bonded filler particles, and the film has a relatively uniform cross section.

11. The method of claim 10 wherein the resin bonding the filler particles is selected from the group consisting of epoxy resin, phenolic resin, polyester resin and melamine formaldehyde resin, the filler particles are sand particles having a particle size between about 40–500 microns, and the resin constitutes about 1 to 18 weight percent based on resin-filler weight.

12. A method of making a permselective polymeric membrane consisting essentially of water insoluble polyamic acid salt polymers comprising the steps of:

A. contacting a solid polyimide film containing imide rings and having a thickness between about 0.01–10 mils with an aqueous solution of a base containing an ion selected from the group consisting of Na, K, Ba and trimethylbenzylammonium to open a substantial portion of the imide rings in the film to form a water insoluble permselective polyamic acid salt polymeric membrane having a thickness between about 0.01-10 mils containing a high concentration of hydrophilic carboxylate salt groups containing an ion selected from the group consisting of Na, K, Ba and trimethylbenzylammonium, and B. reacting the polyamic acid salt membrane with an aqueous metal salt solution containing an ion selected from the group consisting of Mg, Ca, Fe, Ag, Co, Pb, Cu, Li, Mn, Ni, Zn, Hg and Al to substitute the metal portion of the metal salt for all or part of the ions contained in the hydrophilic carboxylate salt groups of the polyamic acid salt polymeric membrane by an ion exchange reaction to provide a water insoluble permselective polyamic acid salt polymeric membrane having a thickness between about 0.01-10 mils containing a high concentration of hydrophilic carboxylate salt groups.

13. A method of making a reverse osmosis liquid treatment system comprising a supported membrane comprising the steps of:

A. reacting an aromatic diamine with an aromatic diacyl halide to form an amine- terminated aromatic polyamide, and then the amine-terminated aromatic polyamide is reacted with a compound selected from the group consisting of aromatic dianhydrides, aromatic anhydride monoacyl halides, aromatic diester diacyl halides and aromatic monoester diacyl halides and mixtures thereof in a solvent comprising an organic aprotic solvent to form a polyamic acid, B. casting a film from the polyamic acid on the inside of a porous tubular support comprising resin bonded filler particles, C. heating the polyamic acid film cast on the support to evaporate solvent and form a solid water insoluble polyimide film containing imide rings and having a thickness between about 0.01–10 mils, and D. contacting the polyimide film on the support with an alkali solution of a base containing an ion selected from the group consisting of Na, K, Ba and trimethylbenzylammonium to open a substantial portion of the imide rings in the polyimide film to provide a reverse osmosis liquid treatment system comprising a supporting porous tube comprising resin bonded filler particles and a supported water insoluble permselective polyamic acid salt polymeric membrane having a thickness between about 0.01-10 mils containing a high concentration of hydrophilic carboxylate salt groups.

14. The method of claim 13 wherein the liquid treatment system also contains liquid feed inlet means and treated liquid outlet means.

15. The method of claim 13 wherein, in step (A) the amine-terminated aromatic polyamide is reacted with an aromatic dianhydride to form a polyamic acid.

16. The method of claim 15 wherein the solution which is used to open the imide rings is an aqueous solution of a base containing an ion selected from the group consisting of Na, K, Ba and trimethylbenzylammonium and the polyimide film is derived from about 4 moles pyromellitic dianhydride, about 9 moles isophthaloyl chloride, about 3 moles terephthaloyl chloride and about 16 moles of m-phenylene diamine.

17. The method of claim 16 wherein the aqueous base solution contacts the polyimide film at a temperature between about −10° to 40°C.

18. The method of claim 16 wherein the resin bonding the filler particles is selected from the group consisting of epoxy resin, phenolic resin, polyester resin and melamine formaldehyde resin, the filler particles are sand particles having a particle size between about 40–500 microns, and the resin constitutes about 1 to 18 weight percent based on resin-filler weight.

19. The method of claim 18 wherein, as a last step the polyamic acid salt membrane is reacted with an aqueous metal salt solution containing an ion selected from the group consisting of Mg, Ca, Fe, Ag, Co, Pb, Cu, Li, Mn, Ni, Zn, Hg, and Al.

20. The method of claim 18 wherein, as a last step the polyamic acid salt membrane is reacted with a solution selected from the group consisting of $MgSO_4$, $CaCl_2$, $FeCl_2$, $FeCl_3$, $CuSO_4$, $Co(NO_3)_2$, $AgNO_3$, $Pb(NO_3)_2$, $LiCl$, $MnSO_4$, $Ni(NO_3)_2$, $ZnCl_2$, $Hg(NO_3)_2$, $NH_4Cl$, $(CH_3)_4NCl$, $(CH_3)_3(C_6H_5CH_2$-$NCl$ and $ClN(CH_3$-$)_3$—$(CH_2)_6$—$N(CH_3)Cl$.

21. The method of claim 12 wherein the polyimide film is derived from about 4 moles pyromellitic dianhydride, about 9 moles of isophthaloyl chloride, about 3 moles terephaloyl chloride and about 16 moles of m-phenylene diamine.

22. The method of claim 12 wherein the aqueous base solution contacts the polyimide film at a temperature between about −10° 40°C.

23. The method of claim 12 wherein the concentration of the aqueous base solution is between about 0.5–20 percent.

24. A method of making a permselective polymeric membrane comprising water insoluble polyamic acid salt polymers comprising the steps of:

A. reacting about 12 moles of at least one aromatic dicarboxylic acid halide and about 16 moles of an aromatic diamine to form an amine terminated polyamide, B. reacting the amine terminated polyamide with about 4 moles dianhydride in a solvent comprising an organic aprotic solvent to form a polyamic acid, C. casting a film from the polyamic acid, D. heating the polyamic acid film to evaporate solvent and form a solid water insoluble polyimide film containing imide rings and having a thickness between 0.01–10 mils, and E. contacting the polyimide film with an aqueous solution of a base containing an ion selected from the group consisting of Na, K, Ba and trimethylbenzylammonium to open a substantial portion of the imide rings in the film to form a water insoluble permselective polyamic acid salt polymeric membrane having a thickness between about 0.01–10 mils containing a high concentration of hydrophilic carboxylate salt groups, said membrane being effective to reject salts in applied solutions.

25. The method of claim 24 wherein the dianhydride and dicarboxylic acid halide are aromatic.

26. The method of claim 25 wherein the dianhydride is pyromellitic dianhydride, the dicarboxylic acid halide is a mixture of isophthaloyl chloride and terephthaloyl chloride and the diamine is $m$-phenylenediamine.

27. The method of claim 25 where after step (C) the imidized film is stripped from the support.

28. The method of claim 25 where the film is cast on the inside of a tubular support comprising resin bonded filler particles.

* * * * *